Dec. 24, 1963         R. C. FERKINS ETAL         3,114,990
CARBIDE TOOL INSERT GRINDING FIXTURE
Filed Aug. 25, 1961

INVENTORS
Russell C. Ferkins &
BY Frederick F. Meyer

A. F. Baillie
ATTORNEY

United States Patent Office 3,114,990
Patented Dec. 24, 1963

3,114,990
CARBIDE TOOL INSERT GRINDING FIXTURE
Russell C. Ferkins, Mooresville, and Frederick F. Meyer, Indianapolis, Ind., assignors to General Motors Corporation, Detroit, Mich., a corporation of Delaware
Filed Aug. 25, 1961, Ser. No. 134,011
5 Claims. (Cl. 51—218)

This invention relates to a grinding fixture and more specifically to a grinding fixture for supporting carbide insert type cutting tools.

In many machining operations carbide insert type cutting tools are utilized. One type of carbide insert, which is commonly used, is the throwaway insert. Throwaway inserts generally comprise relatively thin carbide cutting tools formed in equilateral geometrical shapes, such as triangles or squares. Each of the intersecting surfaces of the triangular or square-shaped inserts are utilized as a cutting edge so that a plurality of cutting edges may be obtained from a single tool insert by indexing the insert on a specially adapted tool holder. Tool inserts of this type are often classified as throwaway type inserts and are discarded after each of the cutting edges has been utilized. One of the more recent advances in the art has been the suggestion of regrinding throwaway type carbide inserts after a predetermined amount of use so that each cutting edge of the inserts may be utilized several times. The present invention relates to apparatus for facilitating the regrinding of throwaway type carbide inserts.

In general, the invention comprises the provision of a specially adapted grinding fixture of simplified design having a special tool seat at one end to receive a throwaway type carbide insert and a spring-biased latch for securing a throwaway type carbide insert on the seat. Furthermore, the grinding fixture is designed so that all of the clamping mechanism is enclosed within the confines of a rectangular block to facilitate handling and fastening of the grinding fixture during a grinding operation.

The object of this invention is to provide a clamping tool for securing a throwaway type carbide insert in position for a grinding operation. A further object of this invention is to provide a simplified clamping device having a minimum number of parts which will securely hold a work piece in position for a grinding operation with a minimum amount of adjustment of the clamping parts. Still another object of this invention is to provide a compact clamping tool having a minimum number of moving parts, all of which are compactly arranged within the confines of the peripheral surfaces of a simple clamping block. Other objects and advantages of the present invention will be apparent from the following detailed description wherein reference is made to the accompanying drawing in which:

Figure 1:
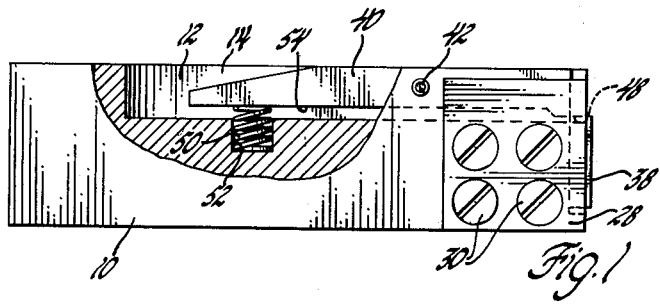
FIGURE 1 is a side elevational view, partly in section, of an illustrative embodiment of the present invention.

Referring now to FIGURES 1–4, the insert holding fixture is shown to comprise a rectangular body portion 10 having a slot 12 formed along one surface thereof and extending to one end thereof. The slot 12 is rectangular in cross section and is defined by spaced upwardly extending side wall portions 14, 16. A seat for a throwaway type carbide insert to be ground is formed on the end of the block 10 whereat the groove 12 terminates. The seat comprises a back-up face 18 and an inclined seat surface 20 integrally formed on an extension 22 of the block. The other side of the block is cut away to provide an oppositely inclined surface 24 having a plurality of threaded holes 26 formed therein. A side plate 28 is secured to the inclined face 24 by a plurality of screws 30 and has a portion 32 extending outwardly beyond the back-up face 18 to form another inclined seat surface 34 similar to the seat 20, but oppositely inclined relative thereto. The side plate forms an integral extension of the body portion 10 so that holding fixture has a rectangular outline from end to end. The inclined surfaces 20, 34 intersect at 36 to form a V-shaped groove in which a triangular shaped throwaway type carbide insert 38 may be received. The carbide insert 38 has three equilateral surfaces and the back-up face 18 is located a sufficient distance from the front wall of the portions 22, 32 so that the carbide insert extends outwardly therefrom when seated on the surfaces 20, 34 and against the back-up surface 18.

Figure 2:
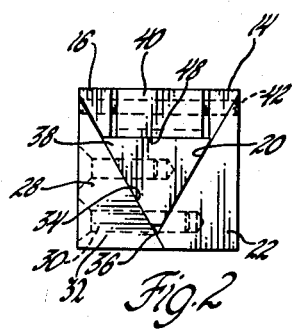
FIGURE 2 is an end view of the apparatus shown in FIGURE 1.
Figure 3:
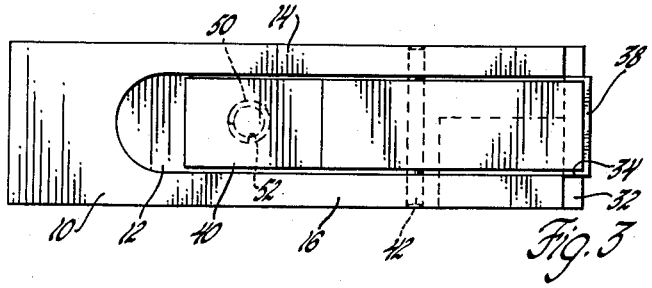
FIGURE 3 is a top view of the apparatus shown in FIGURE 1.
Figure 4:
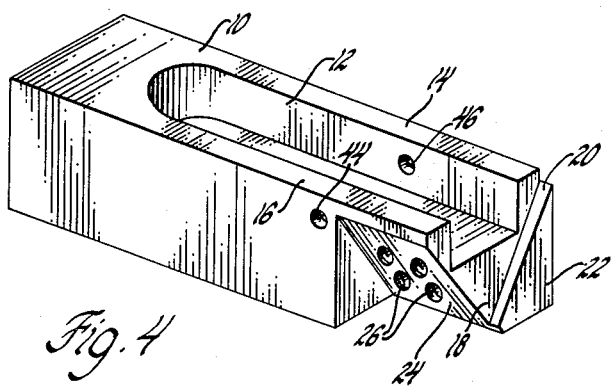
FIGURE 4 is a perspective view of a portion of the apparatus shown in FIGURE 1.

In order to secure the carbide insert on the seat provided by the surfaces 18, 20 and 34, a clamping lever 40 is pivotally mounted on a pin element 42 which is mounted in bores 44, 46 provided in the side walls 14, 16. A jaw portion 48 is provided on one end of the clamping lever and adapted to engage the top surface of the throwaway carbide insert 38 and retain the insert on the seat. A clamping force is exerted on the lever 40 by means of a compression spring 50 mounted in a spring cavity 52 in the bottom of the slot 12. The compression spring is seated against the lower surface 54 of the handle portion of the lever 40. The lever 40 and its associated parts are all located within the confines of the rectangular outline of the block 10 as shown in FIGURE 2 so that the insert holder may be readily mounted and clamped in varying positions for a grinding operation.

Figure 5:
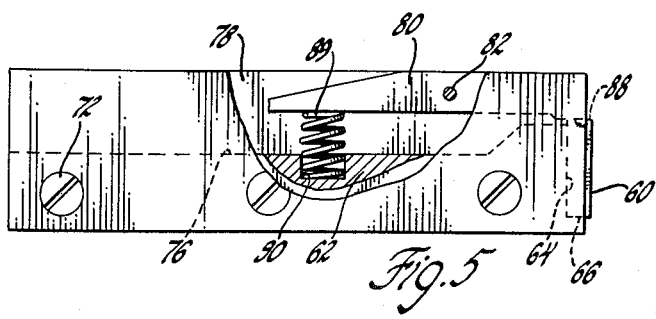
FIGURE 5 is a side elevational view, partly in section, of an alternative embodiment of the present invention.
Figure 6:
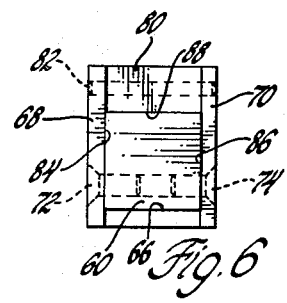
FIGURE 6 is an end view of the apparatus shown in FIGURE 5.

An alternative embodiment of the present invention is shown in FIGURES 5 and 6 and comprises a holder particularly adapted for a square throwaway type carbide insert 60. The holder is formed from a central block 62 which terminates at one end in a back-up surface 64 and a lower seat surface 66. A pair of side plates 68, 70 are secured to the body portion 60 by suitable fasteners 72, 74 and extend upwardly beyond the top surface 76 of the body portion to provide a slot 78 for a lever 80. The lever 80 is pivotally mounted on pin means 82 supported by the side plates 68, 70. The inner surfaces 84, 86 of the side plates form seat surfaces for the carbide insert 60. The lever 80 is provided with a jaw portion 88 adapted to abuttingly engage the upper surface of the insert 60 and clamp the insert on the seat provided by the seat surfaces 64, 66, 84, 86. A compression spring 89 is seated in a spring cavity 90 in the body portion 62 and abuts the lower surface of the handle portion of the lever 80 as hereinbefore described.

In operation, the carbide inserts 38, or 60, are positioned on the seats formed on their respective holders. The clamping levers 40 and 80 are pivoted in a counterclockwise direction against the bias of the compression springs 52, 89 to permit the carbide inserts to be placed on their seats. When the levers 40, 80 are released, the compression spring rotates the levers clockwise until the jaw portions 48, 88 securely engage the upper surfaces of the inserts. In this manner, the inserts are securely held on the insert seats provided. The clamping fixture may then be securely fastened in grinding apparatus for a redressing operation on the inserts. The insert holders are easily secured and clamped in a variety of positions for the grinding operation. The holding fixture may be indexed within a rectangular clamping slot or the like since there are no depending portions of the clamps which extend outwardly beyond the confines of the rectangular peripheries of the holding fixture. In this manner, the clamping fixtures are easily handled and the inserts may be readily positioned on and removed from the seats.

In the claims:

1. A holding fixture for throwaway type carbide insert cutting tools having a plurality of relatively narrow equal length side surfaces; and comprising: a rectangular elongated body member, an elongated groove formed along one elongated side surface of said body member and extending substantially the length of said body member, said groove extending to and terminating at one end of said elongated body member in a rectangular opening, a tool seat formed on said end of said elongated body member and projecting longitudinally beyond said rectangular opening, pin means extending between the side walls of said groove and located intermediate the ends thereof, a spring cavity formed in the bottom of said groove and located beyond said pin means relative to said tool seat, a clamping lever pivotally mounted on said pin means and extending in opposite directions therefrom, one end portion of said clamping lever terminating adjacent said tool seat, a clamping jaw portion formed on the lower surface of said one end portion of said clamping lever and extending outwardly over said seat surface, a compression spring mounted in said cavity and extending upwardly therefrom in engagement with the lower surface of said clamping lever, and the clamping jaw surface of said clamping lever being spaced and positioned relative to said tool seat to engage one of the narrow equal length side surfaces of a throwaway type carbide insert and clamp the other of said narrow equal length side surfaces on said seat with a portion of the carbide insert extending outwardly beyond the end surface of said body member a sufficient distance for performing a redressing operation thereon.

2. The apparatus as defined in claim 1 and wherein said holding fixture has a rectangular peripheral outline from one end to the other whereby any of the side surfaces may clamp against a flat abutment surface.

3. The apparatus as defined in claim 1 and wherein said seat is designed for a triangularly shaped insert and comprises a flat back-up surface intersecting said groove at substantially right angles, a portion of said body member on one side of said groove extending beyond said back-up surface, said portion of said body member having an inclined side surface intersecting said back-up surface at right angles and extending from a point centrally located below said groove to a second point spaced upwardly and outwardly from said groove, a portion of said body member on the other side of said groove and adjacent said back-up surface being formed by a separate element, said element being removably secured to said body member and having a portion extending beyond said back-up surface, and said portion of said element having an inclined side surface intersecting said back-up surface at right angles and extending from said point centrally located below said groove to a third point spaced upwardly and outwardly from said groove opposite said second point.

4. The apparatus as defined in claim 1 and wherein said seat is designed for a square shaped insert and comprises a flat back-up surface intersecting said groove at substantially right angles, a pair of parallel plate members being secured to the side surfaces of said body member and extending thereabove to form a portion of said groove and extending beyond said flat back-up surface to define opposite parallel side surfaces of said seat, and a flat transverse surface spaced below said groove and outwardly of said back-up surface and intersecting said back-up surface and said side surfaces at right angles.

5. A holding fixture for throwaway type carbide insert cutting tools having a plurality of relatively narrow equal length side surfaces comprising; a body member, a seat formed on one end of said body member to receive and abuttingly support a cutting tool insert, jaw means pivotally mounted on said body member, a clamping portion of said jaw means being cooperatively located relative to said seat to clamp a cutting tool insert thereon, spring means associated with said jaw means to bias said clamping portion of said jaw means toward a cutting tool insert engaging position, said jaw means being movable against the bias of said spring means to an open position whereat a cutting tool insert may be moved into and out of said seat, said seat being formed to include a flat back-up surface adapted to abut a major surface of a cutting tool insert and being joined by extension means on said body member adapted to engage one of the narrow equal length side surfaces of the insert, and a removable side plate adapted to cooperate with said extension means and back-up surface being engageable with another equal length side surface of the insert.

References Cited in the file of this patent
UNITED STATES PATENTS 1,813,723     Beaver _____ July 7, 1931
2,692,414     Richardson _____ June 29, 1954